United States Patent
Blackmon et al.

(10) Patent No.: US 12,438,383 B2
(45) Date of Patent: Oct. 7, 2025

(54) CHARGING SYSTEMS FOR AEROSOL-GENERATING DEVICES

(71) Applicant: Altria Client Services LLC, Richmond, VA (US)

(72) Inventors: Zack W. Blackmon, Richmond, VA (US); Thomas Tran, Richmond, VA (US); Terry Bache, Richmond, VA (US); Jarrett Keen, Richmond, VA (US); Niall Gallagher, Richmond, VA (US); Yannick Hourmand, Haslingfield (GB); Guillaume Michel, Cambridge (GB); Rangaraj S. Sundar, Midlothian, VA (US); Raymond W. Lau, Glen Allen, VA (US); Eric Hawes, Midlothian, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 502 days.

(21) Appl. No.: 17/947,588

(22) Filed: Sep. 19, 2022

(65) Prior Publication Data
US 2024/0097463 A1    Mar. 21, 2024

(51) Int. Cl.
*H02J 7/00* (2006.01)
(52) U.S. Cl.
CPC ........ *H02J 7/0036* (2013.01); *H02J 7/00032* (2020.01); *H02J 7/0047* (2013.01); *H02J 7/00712* (2020.01)
(58) Field of Classification Search
CPC .................................................... H02J 7/0036
(Continued)

(56) References Cited

U.S. PATENT DOCUMENTS

| | | |
|---|---|---|
| 9,603,388 B2 | 3/2017 | Fernando et al. |
| 9,854,841 B2 | 1/2018 | Ampolini et al. |

(Continued)

FOREIGN PATENT DOCUMENTS

| | | |
|---|---|---|
| EP | 2790537 A1 | 10/2014 |
| EP | 2875741 A2 | 5/2015 |

(Continued)

OTHER PUBLICATIONS

U.S. Pat. No. 11,515,718, filed Jan. 13, 2022, Ono et al.
1 International Preliminary Report on Patentability for PCT/US2023/074569 mailed Mar. 1, 2025.

*Primary Examiner* — Yalkew Fantu
(74) *Attorney, Agent, or Firm* — Harness, Dickey & Pierce, P.L.C.

(57) ABSTRACT

A charging system for an aerosol-generating device includes a processor and a memory in communication with the processor and configured to store instructions is provided. The instructions define at least one of a disable mode, an intra-session mode, or an inter-session mode. The processor is configured to execute the instructions to cause the charging system to detect when the device is connected to a charging device; activate a power source charger in response to the connection to the charging device; identify a selected mode; enable or disable a heater of the capsule dependent upon the selected mode; if the heater is enabled, display a first display indicating the connection of the charging device; if the heater is enabled, detect if a session of the aerosol-generating device is ongoing; and if the session is ongoing, enable or suspend charging in response to the identification of the selected mode.

18 Claims, 13 Drawing Sheets

(58) Field of Classification Search
USPC ........................................................ 320/165
See application file for complete search history.

(56) References Cited

U.S. PATENT DOCUMENTS

| | | | |
|---|---|---|---|
| 10,051,893 B2 | 8/2018 | Hoffman et al. | |
| 10,218,193 B2 | 2/2019 | Gratton | |
| 10,226,073 B2 | 3/2019 | Bless et al. | |
| 10,333,330 B2 * | 6/2019 | Holzherr | H02J 7/00041 |
| 10,505,383 B2 | 12/2019 | Sur | |
| 10,517,330 B2 | 12/2019 | Sur | |
| 10,575,562 B2 | 3/2020 | Bless et al. | |
| 10,945,462 B2 | 3/2021 | Davis et al. | |
| 11,122,837 B2 | 9/2021 | Mizuguchi et al. | |
| 11,245,281 B2 | 2/2022 | Fernando | |
| 11,246,351 B2 | 2/2022 | Ono et al. | |
| 11,337,464 B2 | 5/2022 | Lee et al. | |
| 11,399,572 B2 | 8/2022 | Akao et al. | |
| 11,452,314 B2 | 9/2022 | Ono et al. | |
| 11,478,020 B2 | 10/2022 | Ono et al. | |
| 11,503,670 B2 | 11/2022 | Takeuchi et al. | |
| 2014/0224267 A1 | 8/2014 | Levitz et al. | |
| 2015/0020831 A1 | 1/2015 | Weigensberg et al. | |
| 2015/0201676 A1 | 7/2015 | Shin | |
| 2015/0224268 A1 * | 8/2015 | Henry | A24F 40/90 |
| | | | 128/202.21 |
| 2015/0305409 A1 | 10/2015 | Verleur et al. | |
| 2015/0333561 A1 | 11/2015 | Alarcon | |
| 2017/0303597 A1 | 10/2017 | Tsui | |
| 2018/0271155 A1 | 9/2018 | Baker et al. | |
| 2018/0296779 A1 | 10/2018 | Takeuchi et al. | |
| 2018/0301915 A1 | 10/2018 | Colotte et al. | |
| 2019/0380395 A1 | 12/2019 | Takeuchi et al. | |
| 2019/0387801 A1 | 12/2019 | Takeuchi et al. | |
| 2020/0128884 A1 | 4/2020 | Yamada et al. | |
| 2020/0352254 A1 | 11/2020 | Yamada et al. | |
| 2020/0397056 A1 * | 12/2020 | Adams | H02J 7/0045 |
| 2021/0106066 A1 | 4/2021 | Hamaguchi | |
| 2021/0315280 A1 | 10/2021 | Alarcon et al. | |
| 2021/0315282 A1 | 10/2021 | Plevnik et al. | |
| 2022/0007718 A1 | 1/2022 | Ono et al. | |
| 2022/0021229 A1 | 1/2022 | Wang et al. | |
| 2022/0022533 A1 | 1/2022 | Smith et al. | |
| 2022/0061399 A1 | 3/2022 | Ferrie et al. | |
| 2022/0110373 A1 * | 4/2022 | Kim | A24F 40/50 |
| 2022/0125120 A1 | 4/2022 | Ono et al. | |
| 2022/0175048 A1 | 6/2022 | Hubbard et al. | |
| 2022/0225672 A1 | 7/2022 | Hawes et al. | |
| 2022/0354175 A1 | 11/2022 | Fu et al. | |
| 2022/0378112 A1 | 12/2022 | Aradachi | |
| 2022/0386701 A1 | 12/2022 | Nakano et al. | |
| 2022/0395030 A1 | 12/2022 | Lee et al. | |
| 2022/0400766 A1 | 12/2022 | Ono et al. | |
| 2022/0400774 A1 | 12/2022 | Jabber et al. | |
| 2022/0407326 A1 | 12/2022 | Schennum et al. | |
| 2023/0009690 A1 | 1/2023 | Pilatowicz | |
| 2023/0020117 A1 | 1/2023 | Takeuchi et al. | |
| 2023/0033791 A1 | 2/2023 | Holzherr et al. | |
| 2023/0091282 A1 | 3/2023 | Kaihatsu et al. | |
| 2023/0106570 A1 | 4/2023 | Yoshida et al. | |
| 2023/0114675 A1 | 4/2023 | Yoshida et al. | |
| 2023/0141366 A1 | 5/2023 | Memari et al. | |
| 2023/0148677 A1 | 5/2023 | Garcia Garcia et al. | |
| 2023/0148678 A1 | 5/2023 | Zominy | |
| 2023/0172284 A1 | 6/2023 | Schennum et al. | |
| 2023/0187956 A1 | 6/2023 | Akao | |
| 2023/0208160 A1 | 6/2023 | Colotte et al. | |
| 2023/0218009 A1 | 7/2023 | Howard et al. | |
| 2023/0218012 A1 | 7/2023 | Jakóbczyk et al. | |
| 2023/0218013 A1 | 7/2023 | Jakóbczyk et al. | |
| 2023/0232910 A1 | 7/2023 | Jakóbczyk et al. | |
| 2023/0240372 A1 | 8/2023 | Dendy et al. | |

FOREIGN PATENT DOCUMENTS

| | | |
|---|---|---|
| EP | 3026779 A1 | 6/2016 |
| EP | 2964038 B1 | 7/2016 |
| EP | 2975956 B1 | 7/2016 |
| EP | 2790537 B1 | 4/2018 |
| EP | 3007571 B1 | 4/2018 |
| EP | 3369328 A2 | 9/2018 |
| EP | 2875740 B1 | 10/2018 |
| EP | 2959786 B1 | 10/2018 |
| EP | 3171720 B1 | 10/2018 |
| EP | 3170414 B1 | 2/2019 |
| EP | 3469934 A1 | 4/2019 |
| EP | 3484012 A1 | 5/2019 |
| EP | 3487332 A1 | 5/2019 |
| EP | 3581038 A1 | 12/2019 |
| EP | 3581039 A1 | 12/2019 |
| EP | 3586654 A1 | 1/2020 |
| EP | 3632239 A1 | 4/2020 |
| EP | 3348156 B1 | 7/2020 |
| EP | 3683919 A1 | 7/2020 |
| EP | 3125707 B1 | 8/2020 |
| EP | 3357358 B1 | 9/2020 |
| EP | 3711500 A1 | 9/2020 |
| EP | 3711502 A1 | 9/2020 |
| EP | 3711514 A1 | 9/2020 |
| EP | 3711515 A1 | 9/2020 |
| EP | 3711516 A1 | 9/2020 |
| EP | 3711531 A1 | 9/2020 |
| EP | 3711542 A1 | 9/2020 |
| EP | 3711560 A1 | 9/2020 |
| EP | 3711564 A1 | 9/2020 |
| EP | 3711567 A1 | 9/2020 |
| EP | 3711578 A1 | 9/2020 |
| EP | 3711580 A1 | 9/2020 |
| EP | 3711584 A1 | 9/2020 |
| EP | 3711585 A1 | 9/2020 |
| EP | 3711587 A1 | 9/2020 |
| EP | 3711588 A1 | 9/2020 |
| EP | 3711589 A1 | 9/2020 |
| EP | 3308661 B1 | 10/2020 |
| EP | 3721732 A1 | 10/2020 |
| EP | 3456214 B1 | 11/2020 |
| EP | 3733023 A1 | 11/2020 |
| EP | 3612044 B1 | 12/2020 |
| EP | 3750422 A1 | 12/2020 |
| EP | 3750424 A1 | 12/2020 |
| EP | 3750426 A1 | 12/2020 |
| EP | 3760066 A1 | 1/2021 |
| EP | 3767780 A1 | 1/2021 |
| EP | 3791742 A1 | 3/2021 |
| EP | 3683921 B1 | 5/2021 |
| EP | 3818854 A2 | 5/2021 |
| EP | 3821734 A1 | 5/2021 |
| EP | 3613453 B1 | 9/2021 |
| EP | 3871522 A1 | 9/2021 |
| EP | 3883400 A1 | 9/2021 |
| EP | 3883401 A1 | 9/2021 |
| EP | 3883402 A1 | 9/2021 |
| EP | 3883413 A1 | 9/2021 |
| EP | 3883414 A1 | 9/2021 |
| EP | 3683923 B1 | 11/2021 |
| EP | 3935966 A1 | 1/2022 |
| EP | 3937339 A1 | 1/2022 |
| EP | 3937340 A1 | 1/2022 |
| EP | 3937342 A1 | 1/2022 |
| EP | 3937343 A1 | 1/2022 |
| EP | 3941222 A1 | 1/2022 |
| EP | 3941224 A1 | 1/2022 |
| EP | 3941239 A1 | 1/2022 |
| EP | 3941240 A1 | 1/2022 |
| EP | 3941243 A1 | 1/2022 |
| EP | 3941247 A1 | 1/2022 |
| EP | 3941262 A1 | 1/2022 |
| EP | 3941263 A1 | 1/2022 |
| EP | 3941264 A1 | 1/2022 |
| EP | 3941265 A1 | 1/2022 |
| EP | 3941266 A1 | 1/2022 |
| EP | 3941270 A1 | 1/2022 |

(56) References Cited

FOREIGN PATENT DOCUMENTS

| | | |
|---|---|---|
| EP | 3941272 A1 | 1/2022 |
| EP | 3941275 A1 | 1/2022 |
| EP | 3942667 A1 | 1/2022 |
| EP | 3136889 B2 | 3/2022 |
| EP | 3769635 B1 | 3/2022 |
| EP | 3965258 A1 | 3/2022 |
| EP | 3491687 B1 | 4/2022 |
| EP | 3682924 B1 | 4/2022 |
| EP | 3982776 A1 | 4/2022 |
| EP | 3995012 A1 | 5/2022 |
| EP | 358103 B1 | 6/2022 |
| EP | 3703519 B1 | 6/2022 |
| EP | 4008194 A1 | 6/2022 |
| EP | 4024585 A2 | 7/2022 |
| EP | 4033636 A1 | 7/2022 |
| EP | 3370552 B1 | 8/2022 |
| EP | 3672430 B1 | 8/2022 |
| EP | 3683917 B1 | 8/2022 |
| EP | 4035546 A1 | 8/2022 |
| EP | 3103085 B1 | 9/2022 |
| EP | 3586654 B1 | 11/2022 |
| EP | 4082369 A1 | 11/2022 |
| EP | 4084270 A1 | 11/2022 |
| EP | 4117470 A1 | 1/2023 |
| EP | 3701817 B1 | 2/2023 |
| EP | 4129098 A1 | 2/2023 |
| EP | 4149300 A1 | 3/2023 |
| EP | 4151101 A1 | 3/2023 |
| EP | 4151105 A1 | 3/2023 |
| EP | 4160505 A1 | 4/2023 |
| EP | 4164439 A1 | 4/2023 |
| EP | 4164440 A1 | 4/2023 |
| EP | 4164441 A2 | 4/2023 |
| EP | 4166022 A1 | 4/2023 |
| EP | 3344315 B1 | 5/2023 |
| EP | 3784080 B1 | 5/2023 |
| EP | 3964088 B1 | 5/2023 |
| EP | 4175502 A1 | 5/2023 |
| EP | 4181714 A1 | 5/2023 |
| EP | 4183281 A1 | 5/2023 |
| EP | 4187676 A1 | 5/2023 |
| EP | 3683918 B1 | 6/2023 |
| EP | 3683922 B1 | 6/2023 |
| EP | 4197080 A1 | 6/2023 |
| EP | 4197081 A1 | 6/2023 |
| EP | 4197375 A1 | 6/2023 |
| EP | 3626092 B1 | 7/2023 |
| GB | 2523585 A | 9/2015 |
| GB | 2525080 A | 10/2015 |
| GB | 2525295 A | 10/2015 |
| GB | 2534726 B | 12/2017 |
| GB | 2525725 B | 4/2018 |
| GB | 2525726 B | 7/2018 |
| GB | 2525723 B | 8/2018 |
| GB | 2525480 B | 10/2018 |
| GB | 2525294 B | 11/2018 |
| GB | 2525727 B | 11/2018 |
| GB | 2529919 B | 11/2018 |
| GB | 2531633 B | 11/2018 |
| GB | 2525722 C | 7/2019 |
| GB | 2525724 C | 11/2019 |
| GB | 2524736 B | 2/2021 |
| GB | 2587745 B | 8/2021 |
| GB | 2524851 B | 10/2021 |
| GB | 2598403 A | 3/2022 |
| WO | 2019061032 A1 | 4/2019 |
| WO | 2021122801 A1 | 6/2021 |
| WO | 2021209771 A1 | 10/2021 |
| WO | 2021213848 A1 | 10/2021 |
| WO | 2021250084 A2 | 12/2021 |
| WO | 2021250086 A1 | 12/2021 |
| WO | 2021250088 A1 | 12/2021 |
| WO | 202218090 A1 | 1/2022 |
| WO | 2022038154 A1 | 2/2022 |
| WO | 202258383 A1 | 3/2022 |
| WO | 2022058727 A1 | 3/2022 |
| WO | 2022230430 A1 | 11/2022 |
| WO | 2022239337 A1 | 11/2022 |
| WO | 2022239370 A1 | 11/2022 |
| WO | 2022269701 A1 | 12/2022 |
| WO | 2023274973 A1 | 1/2023 |
| WO | 202390882 A1 | 5/2023 |
| WO | 2023/104917 A1 | 6/2023 |
| WO | 2023/118786 A1 | 6/2023 |
| WO | 2023111241 A1 | 6/2023 |
| WO | 2023112341 A1 | 6/2023 |
| WO | 2023/128666 A1 | 7/2023 |
| WO | 2023/140572 A1 | 7/2023 |

\* cited by examiner

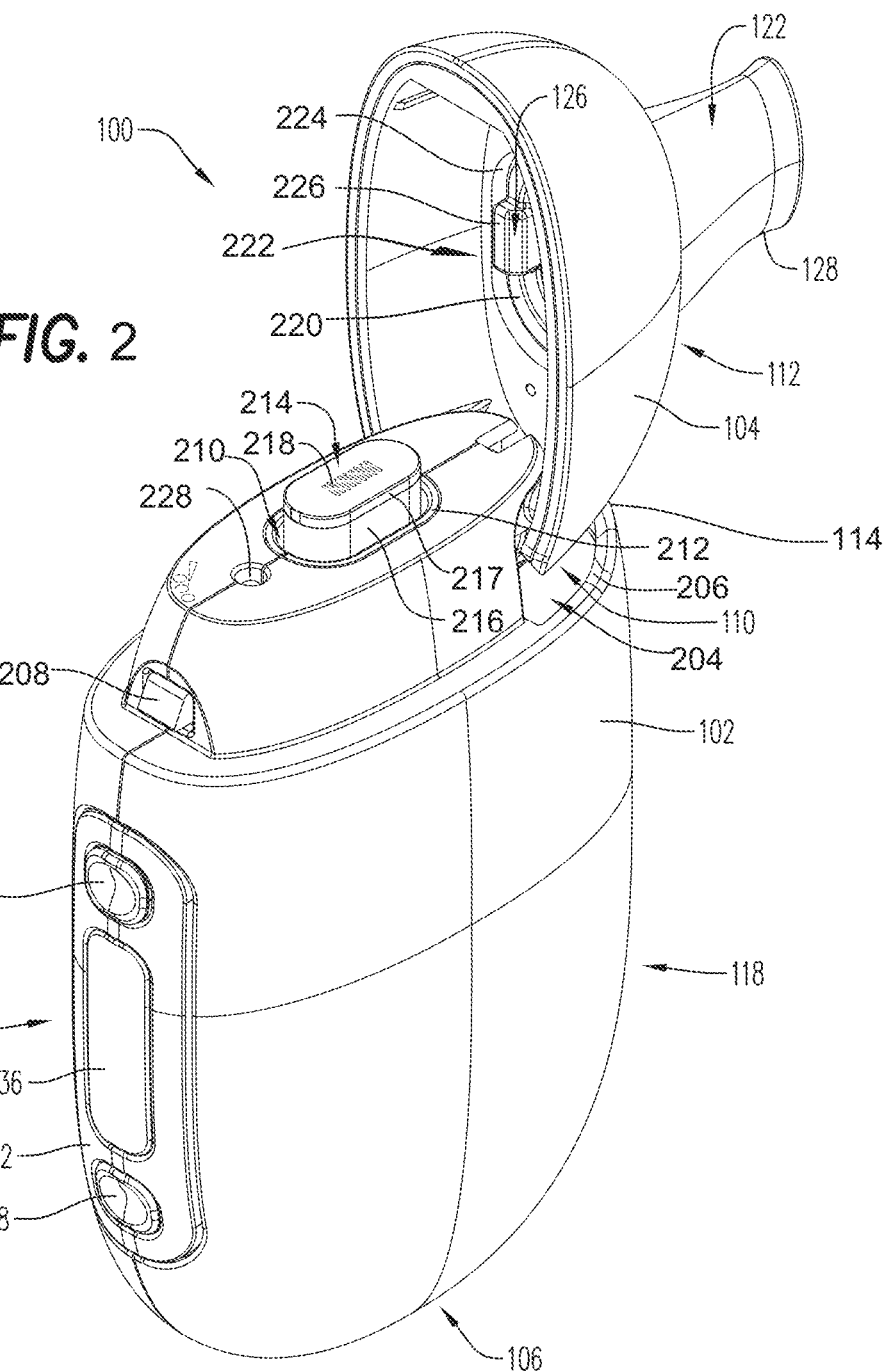

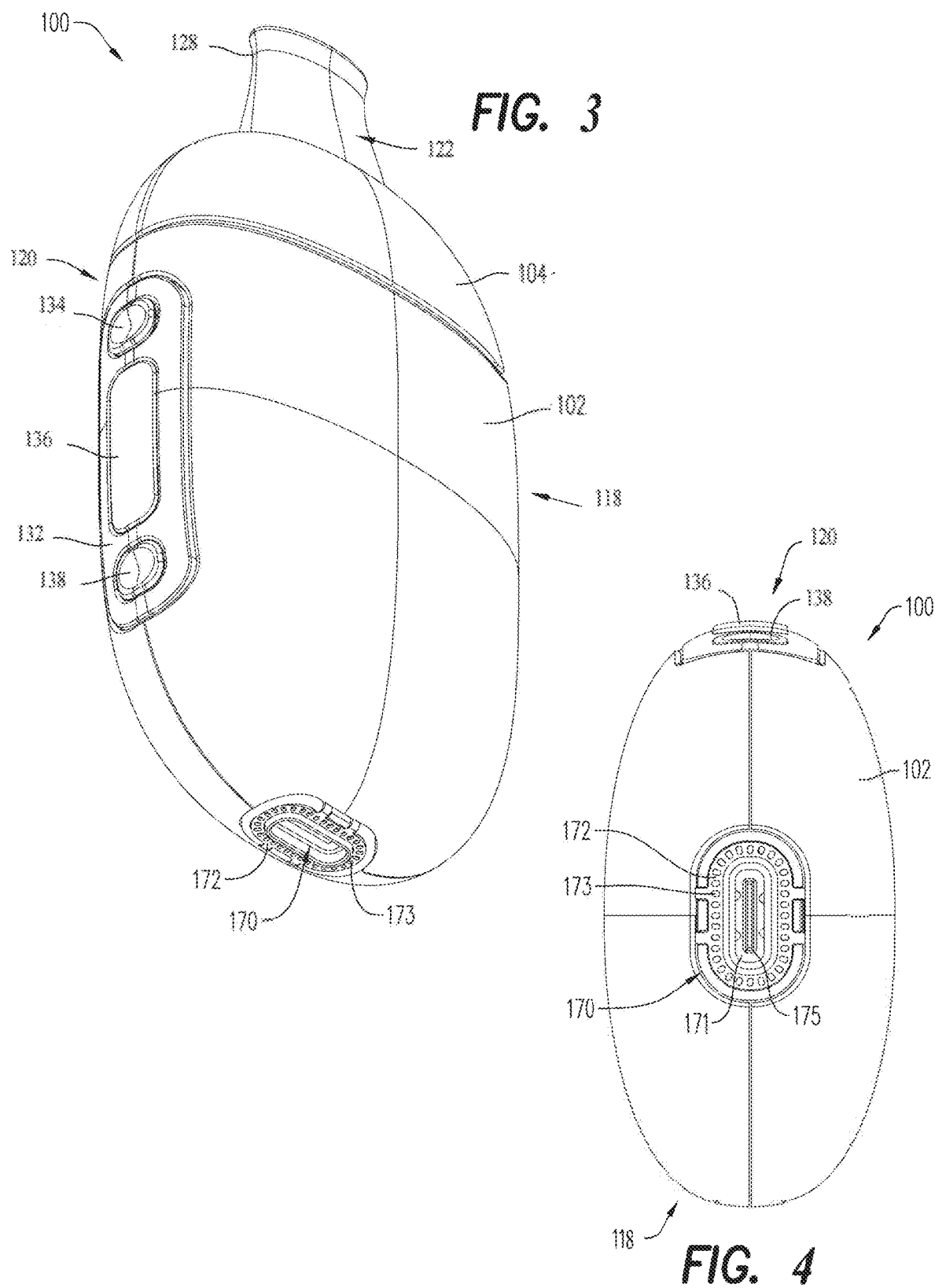

CHARGING SYSTEMS FOR AEROSOL-GENERATING DEVICES

TECHNICAL FIELD

At least some example embodiments relate to aerosol-generating devices, for example heat-not-burn (HNB) aerosol-generating devices configured to generate an aerosol without involving a substantial pyrolysis of an aerosol-forming substrate, and more particularly, but without limitation, to charging systems for aerosol-generating devices, like heat-not-burn (HNB) aerosol-generating devices.

BACKGROUND

Some electronic devices are configured to heat a plant material to a temperature that is sufficient to release constituents of the plant material while keeping the temperature below a combustion point (or ignition temperature) of the plant material so as to avoid any substantial pyrolysis (e.g., self-sustaining burning or a self-sustaining combustion) of the plant material. Such devices may be referred to as aerosol-generating devices (e.g., heat-not-burn aerosol-generating devices and/or heat-not-burn devices), and the plant material heated may be tobacco and/or cannabis. In some instances, the plant material may be introduced directly into a heating chamber of an aerosol-generating device. In other instances, the plant material may be pre-packaged in individual containers to facilitate insertion and removal from an aerosol-generating device.

SUMMARY

New and useful systems, apparatuses, and methods for charging systems for aerosol-generating devices are set forth in the appended claims. Illustrative embodiments are provided to enable a person skilled in the art to make and use the claimed subject matter.

Charging systems in accordance with various aspects of the present disclosure may permit aerosol-generating devices to be used while physically connected to chargers (e.g., charging cables).

For example, in some example embodiments, a charging system may include a processor and a memory in communication with the processor and configured to store instructions. The instructions may define at least one of a disable mode, an intra-session mode, or an inter-session mode. The processor may be configured to execute the instructions to cause the charging system to detect when the aerosol-generating device is connected to a charging device; activate a power source charger in response to the connection to the charging device; identify a selected mode of the at least one of the disable mode, the intra-session mode, or the inter-session mode; enable or disable a heater of the capsule dependent upon the selected mode; if the heater is enabled, display a first display indicating the connection of the charging device; if the heater is enabled, detect if a session of the aerosol-generating device is ongoing; and if the session is ongoing, enable or suspend charging in response to the identification of the selected mode.

In some example embodiments, the selected mode may be the disabled mode, and the processor may be configured to execute the instructions to cause the charging system to disable the heater and display a second icon indicating an active charging state.

In some example embodiments, when no session may be ongoing, the processor may be configured to execute the instructions to cause the charging system to enable charging and also to display a second display indicating a charge state.

In some example embodiments, the selected mode may be the intra-session mode, and the processor may be configured to execute the instructions to cause the charging system to enable the charging and also to display a second display indicating a capsule session progress.

In some example embodiments, the selected mode may be the inter-session mode, and the processor may be configured to execute the instructions to cause the charging system to suspend the charging and also to display a second display indicating a capsule session progress.

In some example embodiments, the processor may be configured to execute the instructions to cause the charging system to suspend the charging by reducing a charging current to 0 mA.

In some example embodiments, the first display may be a lightning bolt icon.

In some example embodiments, the first display may be disposed above a second icon.

In some example embodiments, the second icon may be a capsule session progress indicator.

In some example embodiments, the second icon may be a charge state icon.

In some example embodiments, the processor may be configured to execute the instructions to further cause the charging system to determine if the capsule is present; if the capsule is present the selected mode is identified; and if the capsule is not present, display, on the user interface, a second display indicating charge state.

In some example embodiments, the processor may be configured to execute the instructions to cause the charging system to send one or more signals to the user interface, where the one or more signals indicate that a capsule is absent and prompting the user interface to display the second display.

In some example embodiments, the processor may be configured to execute the instructions to cause the charging system to obtain one or more signals from a charger detection, the one or more signals may indicate that the aerosol-generating device has been connected to the charging device.

In some example embodiments, the processor may be configured to execute the instructions to cause the charging system to send one or more signals to the heating engine control to enable or disable the heater.

In some example embodiments, the processor may be configured to execute the instructions to cause the charging system to obtain one or more signals from a control button, where the one or more signals indicate that a user has switched the device off causing the session to end.

In some example embodiments, the processor may be configured to execute the instructions to cause the charging system to obtain one or more signals from a control button, where the one or more signals indicate that a user has switched the device on causing the session to begin.

In some example embodiments, the processor may be configured to execute the instructions to cause the charging system to send one or more signals to the user interface, where the one or more signals indicate that the charging state and prompting the user interface to display a second display.

In some example embodiments, the processor may be configured to execute the instructions to cause the charging system to activate the power source charge if the charging system obtains one or more signals from a power source monitoring system, where the one or more signals indicate that the power source is not fully charged.

Also described herein is a non-transitory computer-readable medium including instructions. The instructions, when executed by processing circuitry, can cause a system to detect when an aerosol-generating device is connected to a charging device; activating a power source charger in response to the connection to the charging device; identifying a selected mode including at least one of a disable mode, an intra-session mode, or an inter-session mode; enabling or disabling a heater of the capsule dependent upon the selected mode; if the heater is enabled, displaying a first display indicating the connection of the charging device; if the heater is enabled, detecting if a session of the aerosol-generating device is ongoing; and if the session is ongoing, enabling or suspending charging in response to the identification of the selected mode.

In another example embodiment, a system may include processing means configured to detect when an aerosol-generating device is connected to a charging device; activating a power source charger in response to the connection to the charging device; identifying a selected mode including at least one of a disable mode, an intra-session mode, or an inter-session mode; enabling or disabling a heater of the capsule dependent upon the selected mode; if the heater is enabled, displaying a first display indicating the connection of the charging device; if the heater is enabled, detecting if a session of the aerosol-generating device is ongoing; and if the session is ongoing, enabling or suspending charging in response to the identification of the selected mode.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 2 is a top right, front perspective view of the example aerosol-generating device illustrated in FIG. 1, where the lid is in an open position relative to the housing and the housing includes a capsule, in accordance with various aspects of the present disclosure.

FIG. 3 is a bottom right, front perspective view of the example aerosol-generating device illustrated in FIG. 1 in accordance with various aspects of the present disclosure.

FIG. 4 is a bottom view of the example aerosol-generating device illustrated in FIG. 1 in accordance with various aspects of the present disclosure.

DESCRIPTION OF EXAMPLE EMBODIMENTS

Figure 1:
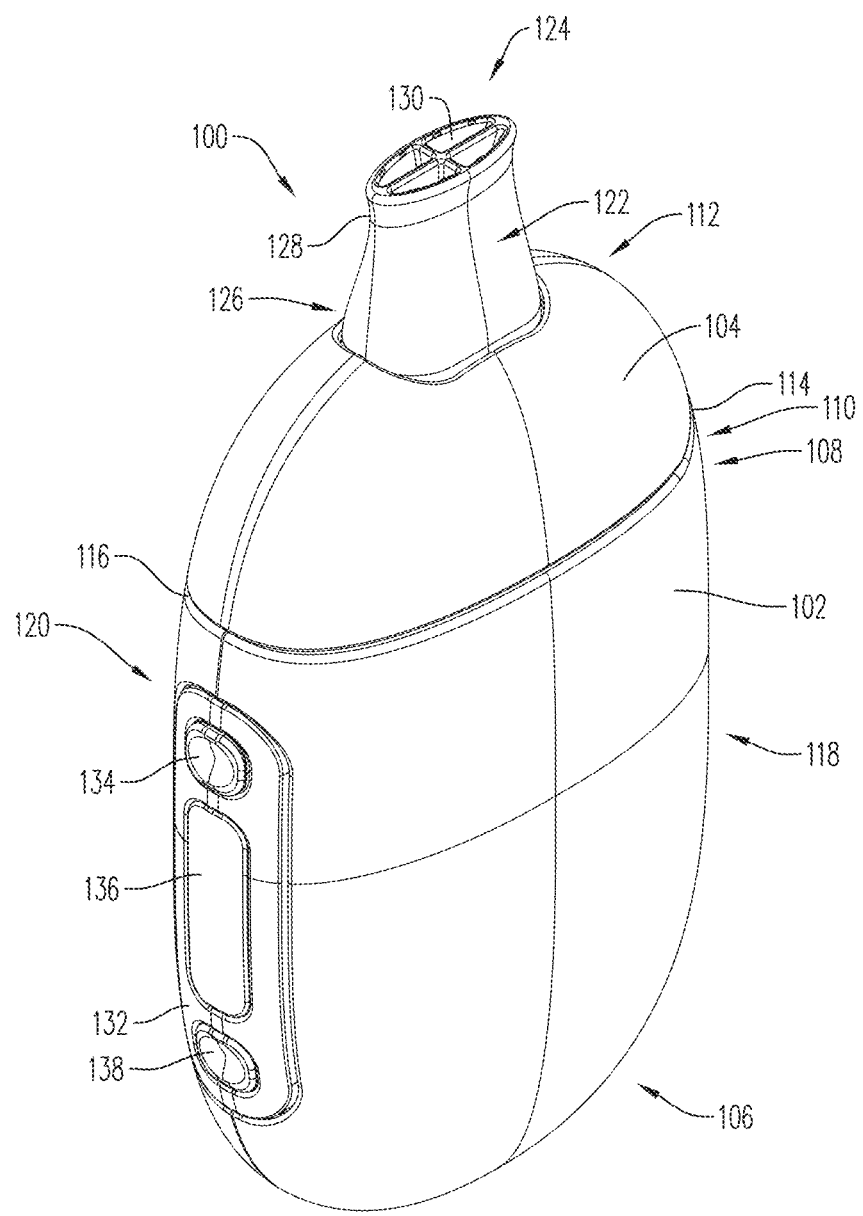
FIG. 1 is a top right, front perspective view of an example aerosol-generating device including a lid and a housing in accordance with various aspects of the present disclosure.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, "coupled" includes both removably coupled and permanently coupled. For example, when an elastic layer and a support layer are removably coupled to one another, the elastic layer and the support layer can be separated upon the application of sufficient force.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

FIGS. 1-3 are illustrations of an aerosol-generating device (e.g., heat-not-burn (HNB) aerosol-generating device) in accordance with at least one example embodiment. For example, FIG. 1 is a top perspective view of the aerosol-generating device 100 including a housing 102 and a lid 104, where the lid 104 is in a closed position relative to the housing 102; FIG. 2 is another top perspective view of the aerosol-generating device 100, where the lid 104 is open relative to the housing 102 and a capsule 200 is received by a capsule-receiving 212 defined in a housing 102; FIG. 3 is a bottom perspective view of the aerosol-generating device 100, where the lid 104 is in a closed position relative to the housing 102; and FIG. 4 is a bottom-up view of the aerosol-generating device 100, where the lid 104 is in a closed position relative to the housing 102.

In some example embodiments, as best illustrated in FIG. 1, the aerosol-generating device 100 has a general oval or oblong or pebble shape. The aerosol-generating device 100 may include a housing 102 and a lid 104 (which can also be referred to as a door) that is configured to open/close relative to the housing 102 (e.g., compare FIG. 1 and FIG. 2). The housing 102 may have a first (or bottom) end 106 and a second (or top) end 108 opposite the first end 106. The lid may have a first end 110 and a second end 112 opposite the first end 110. The first end 110 of the lid 104 may be fixedly coupled to the second end 108 of the housing 102 at a first point 114 and releasably coupleable to the second end 108 of the housing 102 at a second point 116. The first point 114 of the housing 102 may be on a first side 118 of the aerosol-generating device 100. The second point 116 of the housing 102 may be on a second side 120 of the aerosol-generating device 100.

In some example embodiments, the lid 104 may be fixedly coupled to the housing 102 at the first point 114 by a hinge 202, or other similar connector, that allows the lid 104 to move (e.g., swing and rotate) from an open position (see FIG. 2) to a closed position (see FIG. 1). In some example embodiments, the hinge 202 may be a torsion spring. In some example embodiments, the housing 102 may include a recess 204 at the first point 114. The recess 204 may be configured to receive a portion of the lid 104 so as to allow for an easy and smooth movement of the lid 104 from the open position to the closed position (and vice versa). The recess 204 may have a structure that corresponds with a relative portion of the lid 104. For example, as illustrated, the recess 204 may include a substantially curved portion 206 that has a general concave shape that corresponds with the curvature of the lid 104, which has a general convex shape.

In some example embodiments, the lid 104 may be releasably couplable to the housing 102 at the second point 116 by a latch 208, or other similar connector, that allows the lid 104 to be fixed (or secured) in the closed position and easily releasable to allow the lid 104 to move from the closed position (see FIG. 1) to the open position (see FIG. 2). In some example embodiment, the latch 208 may be coupled to a latch release mechanism (not shown) disposed within the housing 102. The latch release mechanism may be configured to move the latch 208 from a first (or closed) position (see FIG. 1) to a second (or open) position (see FIG. 2).

In some example embodiments, the aerosol-generating device 100 may include a mouthpiece 122 that extends from the main body of the aerosol-generating device 100. The mouthpiece 122 may be coupleable to the lid 104. For example, the mouthpiece 122 may include a first end 124 and a second end 126 opposite the first end 124. The second end 126 of the mouthpiece 122 may be coupled to the second end 112 of the lid 104. For example, in some example embodiments, the second end 126 of the mouthpiece 122 may be releasably coupled to the second end 112 of the lid 104.

In some example embodiments, as illustrated, the mouthpiece 122 may be tapered between the first end 124 and the second end 126. For example, the diameter or average length/width dimensions of the first end 124 may be smaller than the diameter or average length/width dimensions of the second end 126. Towards the first end 124, the taper may have a slight inward curvature 128 that is configured to receive the lips of an adult consumer and improve the comfort and experience. In some example embodiments, the first end 124 may have an oblong or elliptical shape and may include one or more outlets 130. For example, the first end 124 may include four outlets 130, such that four or more different areas or quadrants of the adult consumer's mouth can be engaged during use of the device 100. In other embodiments, the mouthpiece 122 may have fewer outlets than the four outlets 130 or more outlets than the four outlets 130.

In some example embodiments, the housing 102 may include a consumer interface panel 132 disposed on the second side 120 of the aerosol-generating device 100. For example, the consumer interface panel 132 may be an oval-shaped panel that runs along the second side 120 of the device 100. The consumer interface panel 132 may include a latch release button 134, as well as a communication (or display) screen 136 and/or a control button 138. For example, in some example embodiments, the consumer interface panel 132 may include the communication screen 136 disposed between the latch release button 134 and the control button 138.

In some example embodiments, the communication screen 136 may be a user interface such as a human-machine interface (HMI) display. In at least one example embodiment, the communication screen 136 may be an integrated thin-film transistor ("TFT") screen. In other example embodiments, the communication screen 136 is an organic light emitting diode ("OLED") or light emitting diode ("LED") screen. In each instance, the communication screen 136 is configured for adult consumer engagement and may have a generally oblong shape.

In some example embodiments, as illustrated, the latch release button 134 may be disposed towards the second end 108 of the device 100, and the control button 138 may be disposed towards the first end 106 of the device 100. The latch release button 134 and the control button 138 may be adult consumer interaction buttons. For example, the control button 138 may turn on and off the aerosol-generating device 100. The latch release button 134 may be configured to activate a latch release mechanism that is configured to move a latch 208 from the first (or closed or secured) position to the second (or open) position, as further detailed below.

In some example embodiments, the latch release button 134 and/or the control button 138 may have substantially circular shapes with center depressions or dimples configured to direct the pressure applied by the adult consumer, although example embodiments are not limited thereto. Although only the two buttons are illustrated, it should be understood more or less buttons may be provided depending on the available features and desired adult consumer interface and the aerosol-generating device 100.

When the lid 104 is in the open position, as shown in FIG. 2, a capsule-receiving cavity 210 of the housing 102 may be exposed. A capsule connector 212 may define the capsule-receiving cavity 210 of the housing 102. In some example embodiments, the capsule connector 212 may be mounted or otherwise secured to a printed circuit board (PCB) within the housing 102. In some example embodiments, as illustrated in FIG. 2, a capsule 214 may be received by the capsule-receiving cavity 210. In some example embodiments, a gasket (not shown) may be disposed around the capsule 214 to help secure the capsule 214 in place within the housing 102.

In some example embodiments, as illustrated, the capsule 214 may include a housing 216 configured to contain an aerosol-forming substrate and a heater (e.g., electrical heater). In some example embodiments, the housing 216 may be in the form of a cover, such as a shell or a box sleeve. In some example embodiments, the capsule 214 can include a first end cap 217 defining (or disposed on) a first (or top) end of the capsule 214 and a second end cap (not shown) defining (or disposed on) a second (or bottom) end of the capsule 214 opposite to (or away from) the first end. For example, the second end cap may be opposite the first end cap 217 such that is disposed within the housing 102 when the capsule 214 is received by the capsule-receiving cavity 210. In some example embodiments, the first end cap 217 can include a first opening 218. In other example embodiments, the first opening 218 may be a series of openings disposed through the first end cap 217. Similarly, in some example embodiment, the second end cap can include a second opening or a series of openings in some embodiments. In some example embodiments, the first end cap 217 and/or the second end cap may be transparent so as to serve as windows configured to permit a viewing of the contents/components (e.g., aerosol-forming substrate and/or heater) within the capsule 214.

In some example embodiments, the aerosol-forming substrate may be a material, or combination of materials, that may yield an aerosol. An aerosol relates to the matter generated (or output) by the aerosol-generating device(s) disclosed, claimed, and equivalents thereof. The material may include a compound (e.g., nicotine, cannabinoid), wherein an aerosol including the compound is produced when the material is heated. The heating may be below the combustion temperature so as to produce an aerosol without involving a substantial pyrolysis of the aerosol-forming substrate or the substantial generation of combustion byproducts (if any). Thus, in some example embodiments, pyrolysis does not occur during the heating and resulting production of aerosol. In other example embodiment, there may be some pyrolysis and combustion byproducts, but the extent may be considered relatively minor and/or merely incidental.

In some example embodiments, the aerosol-forming substrate may be a fibrous material. For instance, the fibrous material may be a botanical material. The fibrous material is configured to release a compound when heated. The compound may be a naturally occurring constituent of the fibrous material. For instance, the fibrous material may be plant material such as tobacco, and the compound released may be nicotine. The term "tobacco" includes any tobacco plant material including tobacco leaf, tobacco plug, reconstituted tobacco, compressed tobacco, shaped tobacco, or powder tobacco, and combinations thereof from one or more species of tobacco plants, such as *Nicotiana rustica* and *Nicotiana tabacum*.

In some example embodiments, the tobacco material may include material from any member of the genus *Nicotiana*. In addition, the tobacco material may include a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof, and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass. Furthermore, in some instances, the tobacco material may be mixed and/or combined with at least one of propylene glycol, glycerin, sub-combinations thereof, or combinations thereof.

In some example embodiments, the compound may also be a naturally occurring constituent of a medicinal plant that has a medically-accepted therapeutic effect. For instance, the medicinal plant may be a cannabis plant, and the compound may be a cannabinoid. Cannabinoids interact with receptors in the body to produce a wide range of effects. As a result, cannabinoids have been used for a variety of medicinal purposes (e.g., treatment of pain, nausea, epilepsy, psychiatric disorders). The fibrous material may include the leaf and/or flower material from one or more species of cannabis plants such as *Cannabis sativa, Cannabis indica*, and *Cannabis ruderalis*. In some instances, the fibrous material is a mixture of 60-80% (e.g., 70%) *Cannabis sativa* and 20-40% (e.g., 30%) *Cannabis indica*.

Examples of cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrahydrocannabinolic acid (THCA) is a precursor of tetrahydrocannabinol (THC), while cannabidiolic acid (CBDA) is precursor of cannabidiol (CBD). Tetrahydrocannabinolic acid (THCA) and cannabidiolic acid (CBDA) may be converted to tetrahydrocannabinol (THC) and cannabidiol (CBD), respectively, via heating. In an example embodiment, heat from a heater may cause decarboxylation so as to convert the tetrahydrocannabinolic acid (THCA) in the capsule to tetrahydrocannabinol (THC), and/or to convert the cannabidiolic acid (CBDA) in the capsule to cannabidiol (CBD).

In instances where both tetrahydrocannabinolic acid (THCA) and tetrahydrocannabinol (THC) are present in the capsule, the decarboxylation and resulting conversion will cause a decrease in tetrahydrocannabinolic acid (THCA) and an increase in tetrahydrocannabinol (THC). At least 50% (e.g., at least 87%) of the tetrahydrocannabinolic acid (THCA) may be converted to tetrahydrocannabinol (THC) during the heating of the capsule. Similarly, in instances where both cannabidiolic acid (CBDA) and cannabidiol (CBD) are present in the capsule, the decarboxylation and resulting conversion will cause a decrease in cannabidiolic acid (CBDA) and an increase in cannabidiol (CBD). At least 50% (e.g., at least 87%) of the cannabidiolic acid (CBDA) may be converted to cannabidiol (CBD) during the heating of the capsule.

In some example embodiments, the compound may be or may additionally include a non-naturally occurring additive that is subsequently introduced into the fibrous material. In one instance, the fibrous material may include at least one of cotton, polyethylene, polyester, rayon, combinations thereof, or the like (e.g., in a form of a gauze). In another instance, the fibrous material may be a cellulose material (e.g., non-tobacco and/or non-cannabis material). In either instance, the compound introduced may include nicotine, cannabinoids, and/or flavorants. The flavorants may be from natural sources, such as plant extracts (e.g., tobacco extract, cannabis extract), and/or artificial sources. In yet another instance, when the fibrous material includes tobacco and/or cannabis, the compound may be or may additionally include one or more flavorants (e.g., menthol, mint, vanilla). Thus, the compound within the aerosol-forming substrate may include naturally occurring constituents and/or non-naturally occurring additives. In this regard, it should be understood that existing levels of the naturally occurring constituents of the aerosol-forming substrate may be increased through supplementation. For example, the existing levels of nicotine in a quantity of tobacco may be increased through supplementation with an extract containing nicotine. Similarly, the existing levels of one or more cannabinoids in a quantity of cannabis may be increased through supplementation with an extract containing such cannabinoids.

In some example embodiments, the capsule-receiving cavity 210 may have a base that may be disposed inside the housing 102. In some example embodiments, the base may include at least one contact point that may be configured to couple to one or more contact points of the capsule 214 when the capsule 214 is received by the capsule-receiving cavity 210. When the capsule 214 is inserted into the capsule-receiving cavity 210, the weight of the capsule 214 itself may not be sufficient to compress the at least one contact point of the base of the capsule-receiving cavity 210. As a result, the capsule 214 may simply rest on exposed pins of the at least one contact point without any compression (or without any significant compression) of electrical contacts of the at least one contact point. In some example embodiments, the weight of the lid 104 itself, when pivoted to transition to a closed position, may not compress the electrical contacts of the at least one contact point to any significant degree and may, instead, simply rest on the capsule 214 in an intermediate, partially open/closed position. In such embodiments, a deliberate action (e.g., downward force) should be applied to the lid 104 to close the lid 104 and thereby cause an interior-facing surface 220 of the lid 104 to press down onto the capsule 214 providing the desired seal and also cause the capsule 214 to compress and, thus, fully engage the electrical contacts of the at least one contact point. In some example embodiments, a full closure of the lid 104 may also result in an engagement with the latch 208, which may maintain the closed position and the desired mechanical/electrical engagements involving the capsule 214 until released (e.g., via the latch release button 134). The force requirement for closing the lid 104 may help to ensure and/or improve air/aerosol sealing and to provide a more robust electrical connection, as well as improved device and thermal efficiency and battery life by reducing or eliminating early power draws and/or parasitic heating of the capsule 214.

In some example embodiments, the lid 104 may include an inner cavity 222 that may be adapted to receive the housing 102 when the lid is in the closed position. In some embodiments, the inner cavity 222 of the lid 104 may include an impingement or engagement member or the surface 220 configured to engage the capsule 214 when the lid 104 is pivoted to transition to the closed position. The surface 220 of the lid 104 may include a recess that may correspond to the size and shape of the capsule and/or a resilient material to enhance an interface with the capsule to provide the desired seal. In some example embodiments, the lid 104 may further include an opening 224 that may be adapted to receive the second end 126 of the mouthpiece 122. The mouthpiece 122 may include at least one extension 226 that may be received by the opening 224 of the lid 104 to secure the mouthpiece 122 to the lid 104. In some example embodiments, the lid 104 may further include a projection (not shown) that may be configured to couple with a recess 228 of the housing 102. The projection may fit within the recess 228 when the lid 104 is coupled to the housing 102 in the closed position.

In some example embodiments, the housing 102 defines a charging connector (or port) 170. For example, as best illustrated in FIG. 3, the charging connector 170 may be defined/disposed in a bottom (or first) end 105 of the housing 120 distal from the capsule-receiving cavity 210. The charging connector 170 may be configured to receive an electric current (e.g., via a USB/mini-USB cable) from an external power source so as to charge a power source internal to the aerosol-generating device 100. The power source may include one or more batteries such as a rechargeable dual battery arrangement, a lithium-ion battery, and/or fuel cells. In some example embodiments, the charging connector 170 may also be configured to send data to and/or receive data (e.g., via a USB/mini-USB cable) from another aerosol-generating device (e.g., heat-not-burn (HNB) aerosol-generating device) and/or other electronic device (e.g., phone, tablet, computer, and the like). In some example embodiments, the aerosol-generating device 100 may instead, or additionally, be configured for wireless communication (e.g., via Bluetooth) with such other aerosol-generating devices and/or electronic devices.

In some example embodiments, as best illustrated in FIG. 4, the charging connector 170 may be an assembly defining a cavity 171 that has a projection 175 within the cavity 171. In some example embodiments, the projection 175 does not extend beyond the rim of the cavity 171. In some example embodiments, the charging connector 170 includes a protective grille 172 that surrounds at least a portion of the cavity 171. As illustrated, the protective grille 172 may have an annular form that surrounds the cavity 171. The protective grille 172 may be configured to help reduce or prevent debris ingress and/or the inadvertent blockage of the incoming airflow. For example, the protective grille 172 may define a plurality of pores 173 along its length or course. For example, the pores 173 may also be arranged (e.g., in a serial arrangement) around the cavity 171. Each of the pores 173 may have an oval or circular shape, although not limited thereto.

In some example embodiments, the pores 173 in the protective grille 172 may function as inlets for air drawn into the aerosol-generating device 100. During the operation of the aerosol-generating device 100, ambient air entering through the pores 173 in the protective grille 172 may converge to form a combined flow that then travels to the capsule 200. For example, the pores 173 may be in fluidic communication with the capsule-receiving cavity 210. In some example embodiments, air may be drawn from the pores 173 and through the capsule-receiving cavity 130. For example, air may be drawn through a capsule 200 received by the capsule-receiving cavity 210 and out of the mouthpiece 122.

In some example embodiments, the protective grille 172 may include an approved food contact material. For example, the protective grille 172 may include plastic, metal (e.g., stainless steel, aluminum), or any combination thereof. In some example embodiments, a surface of the protective grille 172 may be coated with a thin layer of plastic and/or anodized. In some example embodiments, an exterior of the housing 102 and/or the lid 104 may be formed from a metal (such as aluminum, stainless steel, and/or the like); an aesthetic, food contact rated plastic (such as a polycarbonate (PC), acrylonitrile butadiene styrene (ABS) material, liquid crystalline polymer (LCP), a copolyester plastic, and/or any other suitable polymer and/or plastic); or any combination thereof. In some example embodiments, the mouthpiece 122 may be similarly formed from a metal (such as aluminum, stainless steel, and/or the like); an aesthetic, food contact rated plastic (such as, a polycarbonate (PC), acrylonitrile butadiene styrene (ABS) material, liquid crystalline polymer (LCP), a copolyester plastic, and/or any other suitable polymer and/or plastic); plant-based materials (such as wood, bamboo, and the like); or any combination thereof. In some example embodiments, one or more interior surfaces of the housing 102 and/or the lid 104 may be formed from or coated with a high temperature plastic (such as, polyetheretherketone (PEEK), liquid crystal polymer (LCP), and/or the like).

As should be understood, the device 100 and capsule 214 include additional components (e.g., heater and internal air flow path) such as described in "HEAT-NOT-BURN (HNB) AEROSOL-GENERATING DEVICES AND CAPSULES", filed on the same day herewith and assigned application Ser. No. 17/947,436, the entire contents of which are herein incorporated by reference.

Figure 5:
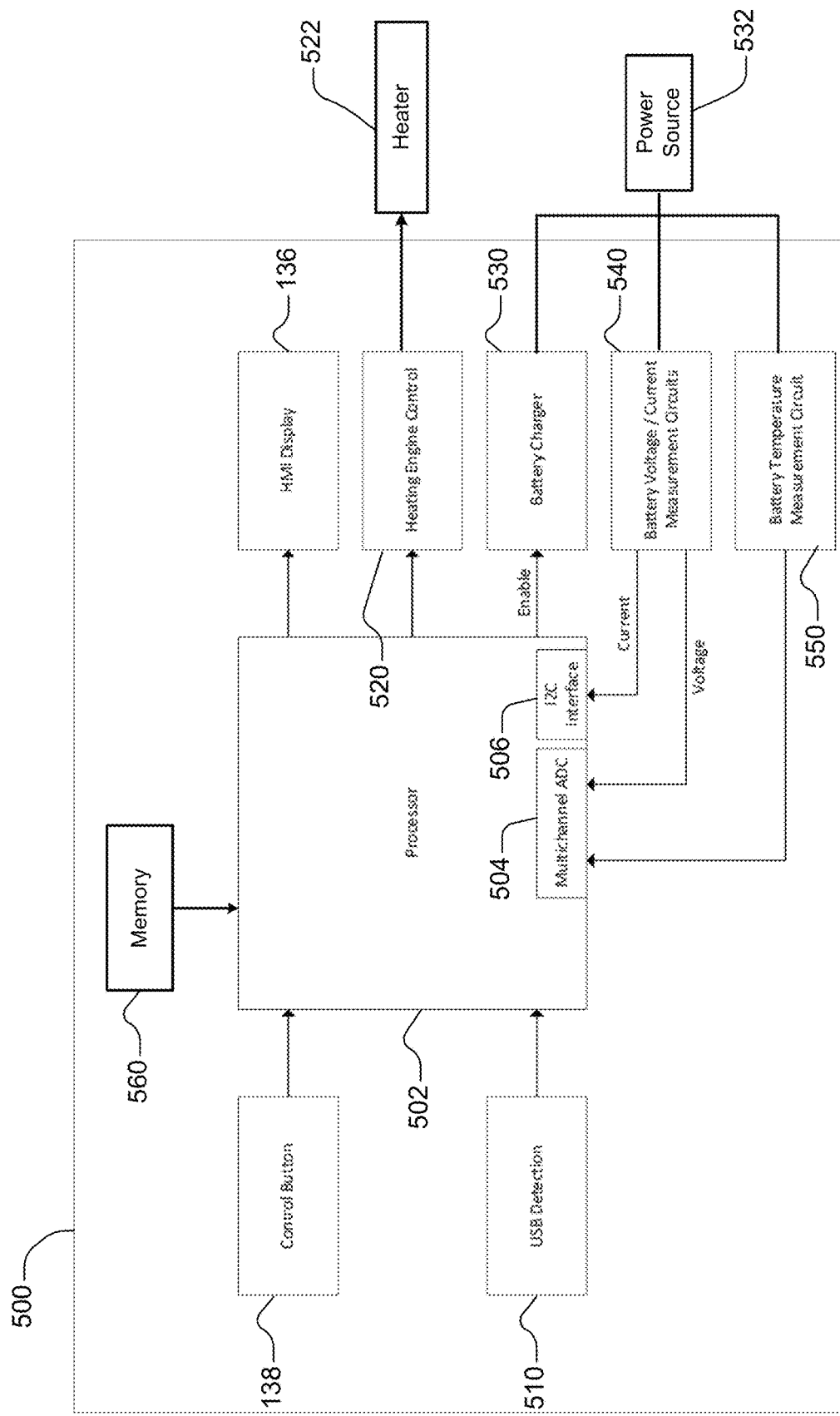
FIG. 5 is a block diagram illustrating an example charging system for use in an example aerosol-generating device, like the aerosol-generating device illustrated in FIGS. 1-4, in accordance with various aspects of the present disclosure.

FIG. 5 is a block diagram illustrating an example charging system 500 for use in an aerosol-generating device, like the aerosol-generating device 100 illustrated in FIGS. 1-4. The charging system 500 may be used to accommodate multiple use scenarios, for example where a charging device (e.g., charger or charging cable) is connected to (or received by) the charging connector (or port) 170 and where charging is ongoing using the charging device connected (or received by) the charging connector (or port) 170. In some example embodiments, the multiple use scenarios include, for example, a first (or disable) mode, a second (or intra-session) mode, and a third (or inter-session) mode. The first mode describes the state when (or indicates that) usage of the aerosol-generating device 100 is unavailable (or not permitted) while the charging device is connected to (or received by) the charging connector (or port) 170. The second mode describes the state when (or indicates that), although charging of the aerosol-generating device 100 is ongoing (e.g., the charging connector (or port) 170 is in communication with the charging device), the aerosol-generating device 100 may be used (e.g., an aerosol may be generated). The second mode describes the state when (or indicates that) the aerosol-generating device 100 can be charged during and/or between aerosol-generating sessions. The third mode describes that state when (or indicates that) the aerosol-generating device 100 may be used (e.g., an aerosol may be generated) when the charging device is connected to (or received by) the charging connector (or port) 170, but only when the charging is paused (or stopped). In the third mode, charging occurs only when the aerosol-generating device 100 is not being used (i.e., when the aerosol-generating device 100 is not actively used for heating). The third mode occurs describes the state (or indicates that) the aerosol-generating device 100 can be charged only between aerosol-generating sessions. In some example embodiments, the selection of a particular mode (i.e., the first mode as opposed to the second mode or the third mode, the second mode as opposed to the third mode, etc.) may be a preselected factory setting.

In some example embodiments, the charging system 500 includes a processor 502, a charger detection (or connection) circuit 510, a heating engine control 520, a battery charger 530, a battery monitoring system (or battery voltage/current measurement circuits) 540, a battery temperature measurement circuit 550, and a memory 560, as well as the control button 138 and the communication screen 136. For example, the processor 502 may communicate with the charger detection circuit 510, the heating engine control 520, the battery charger 530, the battery monitoring system 540, the battery temperature measurement circuit 550, and the memory 560, as well as the control button 138 and the communication screen 136. In some example embodiments, the processor 502 includes a multichannel analog-to-digital converter (ADC) 504 and/or an inter-integrated circuit (I2C) interface 506. The battery monitoring system 540 may communicate with the multichannel analog-to-digital converter (ADC) 504 and the inter-integrated circuit (I2C) interface 506. The battery temperature measurement circuit 550 may communicate with the multichannel analog-to-digital converter (ADC) 504.

In some example embodiments, the processor 502 includes hardware including logic circuits, a hardware/software combination that may be configured to execute software, or any combination thereof. For example, the processor 502 may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or other similar devices. In some example embodiments, the processor 302 is configured as a special purpose machine (e.g., a processing device) designed to execute the software (or instructions) stored, for example, in the memory 560. In some example embodiments, the software (or instructions) may be embodied as program code including instructions for performing and/or controlling any or all operations described herein as being performed by the processor 502. In some example embodiments, the processor 502 may include other processing circuitry or control circuitry.

Figure 8:
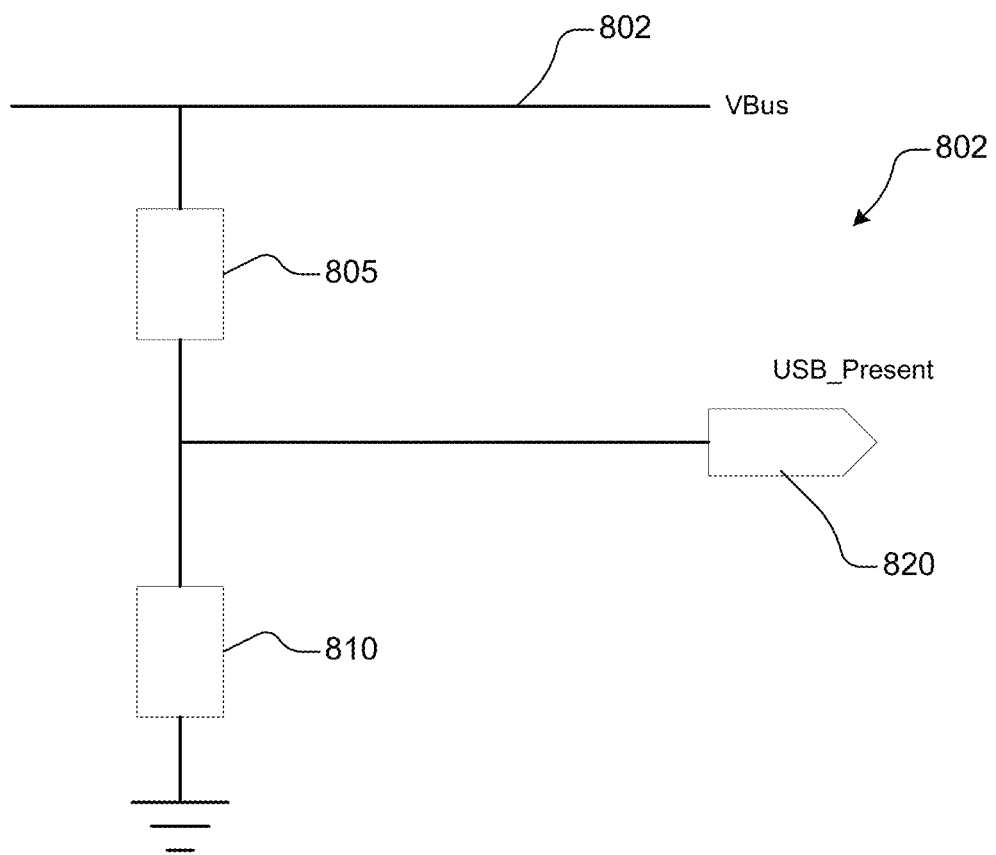
FIG. 8 illustrates a charger detection circuit in accordance with various aspects of the present disclosure.

In some example embodiments, the charger detection circuit 510 may be configured to generate a signal indicating that the aerosol-generating device 100 has been connected to, or disconnected from, a charging device (e.g., charger or charging cable, like a USB cable). FIG. 8 illustrates an example embodiment of the charger detection circuit 510. In some example embodiments, the charger detection circuit 510 includes a detection line 802 and a voltage divider. The voltage divider may include resistors 805 and 810. The resistors 805 and 810 may be connected in series. A first end of the first resistor 805 may be connected to the detection line 802 and a second end of the first resistor 805 may be connected to a first end of the second resistor 810 and an output 820. The output 820 may be connected to/provided to the processor 802. A second end of the second resistor 810 may be connected to ground. When a charging device is connected to the aerosol-generating device 100, the charging device may provide a voltage (e.g., VBus, 5V) on the detection line 802, which can be divided by the resistors 805 and 810. A detection signal USB_present may be output at the output 820 and provided to the processor 502.

In some example embodiments, the processor 502 receives a signal indicating that the aerosol-generating device 100 has been connected to the charging device (and other battery charging checks are satisfactory) and causes the battery charging process to be initiated.

In some example embodiments, the heating engine control 520 may be configured to provide energy to the heater 522 disposed in the housing 216 defining the capsule 214. In some example embodiments, the processor 502 may determine an energy provided to the heater based on the selected mode of the charging system 500. For example, during the first (or disable) mode, the processor 502 controls the heating engine control 520 such that no energy may be provided to the heater while a charging device is detected, while during the second (or intra-session) mode, the processor 502 controls the heating engine control 520 such that energy may be provided to the heater during active charging, and during the third (or inter-session) mode, the processor 502 controls the heating engine control 520 such that energy may be provides to the heater only when no active charging occurs. In some example embodiments, the heating engine control 520 may be as described in U.S. application Ser. No. 17/151,406, titled "HEAT-NOT-BURN (HNB) AEROSOL-GENERATING DEVICES INCLUDING INTRA-DRAW HEATER CONTROL, AND METHODS OF CONTROLLING A HEATER", filed Jan. 18, 2022, the entire contents of which is incorporated herein by reference.

In some example embodiments, the battery charger 530 may be configured to control a physical battery charger chipset and associated electrical protection circuitry to provide charge current to the power source 532. In some example embodiments, the charging system 500 may be used to suspend the battery charger 530. In some example embodiments, the battery charger 530 may include a TEXAS INSTRUMENTS BQ25302 Battery Charger chipset that includes a #EN (Enable) pin, where the #EN (Enable) pin can be used to enable or disable the battery charger 530. In other example embodiments, the battery charger 530 may include a LINEAR TECHNOLOGIES LTC4095 Battery Charger chipset that includes a SUSP pin, where the SUSP pin chipset can be used to enable or disable the battery charger 530.

In some example embodiments, the battery monitoring system (or battery voltage/current measurement circuits) 540 may be configured to measure key battery parameters. For example, the battery monitoring system 540 may provide the battery voltage as a direct measurement using a potential divider and the battery current as a physical gas gauge chipset. In some example embodiments, the battery monitoring system 540 may be configured to generate a signal indicating that the aerosol-generating device 100 has entered a low battery state. In some example embodiments, when the processor 502 determines that the aerosol-generating device 100 has entered a low battery state, any ongoing sessions may end. The battery monitoring system 312 may generate a signal indicating that the aerosol-generating device 100 has entered a low battery state when the power source 532 reaches a charge that is lower than a threshold indicating that the aerosol-generating device 100 is in a low battery state and that the aerosol-generating device 100 cannot continue to operate until it has been connected to a charging device and/or recharged depending on the mode of the charging system 500.

Figure 9:
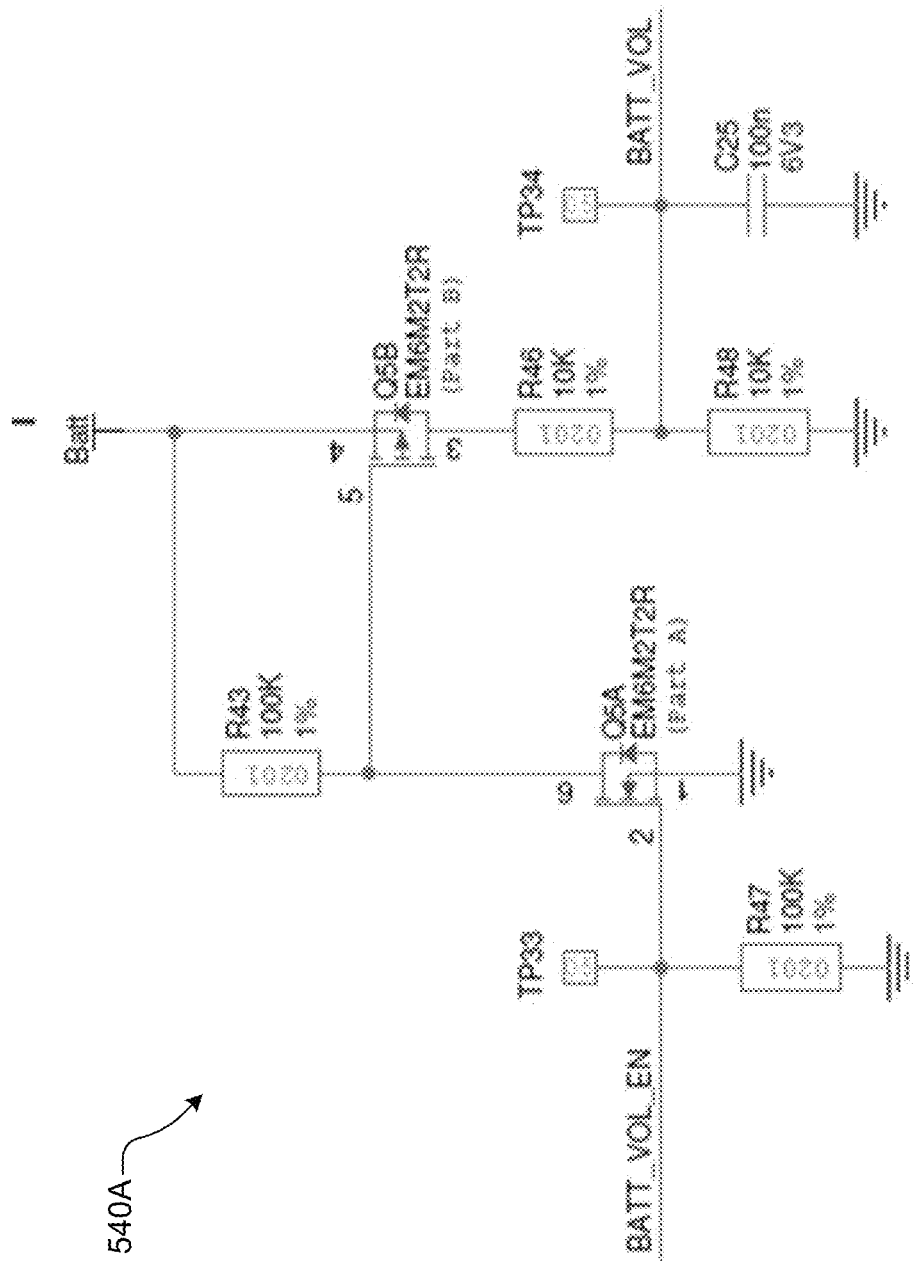
FIG. 9 illustrates a battery voltage circuit in accordance with various aspects of the present disclosure.

FIG. 9 illustrates an example embodiment of a battery voltage circuit 540A. In some example embodiments, the battery voltage circuit 540A includes a resistor R47, an enable control transistor Q5, a resistor R43, a battery transistor Q5B, resistors R46 and R48, and a capacitor C25. A first end of the resistor R47 and a gate of the transistor Q5 may be connected to a battery voltage enable input BATT_VOL_EN. The battery voltage enable input BATT_VOL_EN may be a GPIO line from the processor 502. A second end of the resistor R47 and a source of the transistor Q5A may be connected to ground. A first end of resistor R43 and a source of transistor Q5B may be connected to the battery voltage Batt. A gate of the transistor Q5B may be connected to a second end of the resistor R43 and a drain of the resistor Q5A. A drain of the transistor Q5B may be connected to a first end of the resistor R46. A second end of the resistor R46 may be connected to a first end of the resistor R48, a first end of the capacitor C25, and an output that outputs a battery measurement output voltage BATT_VOL, that is provided to the processor 502. The battery measurement output voltage BATT_VOL may be the voltage read by the processor 502. A second end of the resistor R48 and a second end of the capacitor C25 may be connected to ground. The resistors R46 and R48 may form a voltage divider that performs the measurement. The enable control transistor Q5A and battery voltage pass transistor Q5B may prevent/reduce a leakage path to GND draining the battery during storage. A positive terminal of the power source (e.g., battery) may be connected to the "Batt" signal. In some example embodiments, the BATT_VOL may be measured by the multichannel analog-to-digital converter (ADC) 504.

Figure 10:
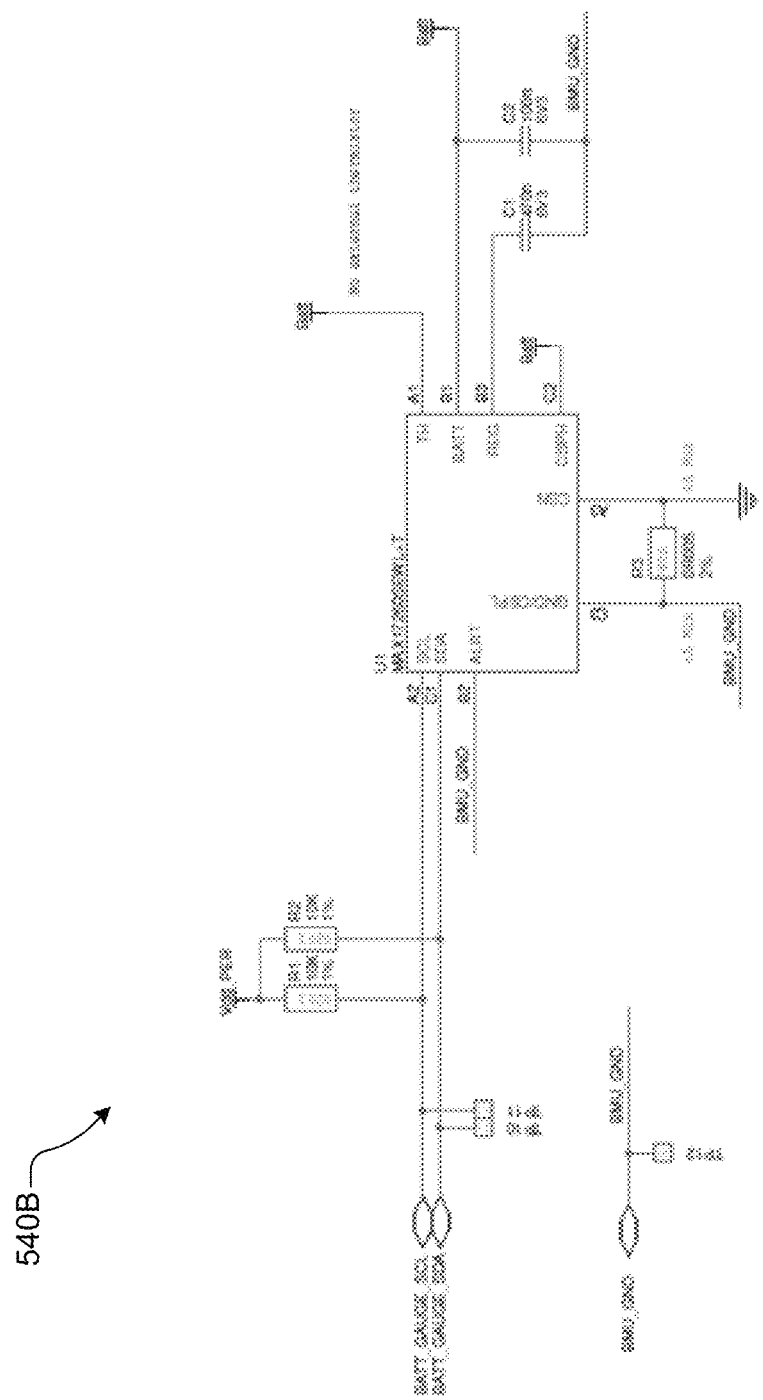
FIG. 10 illustrates a battery current circuit in accordance with various aspects of the present disclosure.

FIG. 10 illustrates an example embodiment of a battery current circuit 540B. In some example embodiments, the battery current circuit 540B may include a battery gas gauge chip U1, which may be a Maxim Integrated MAX17260. The chip may receive data from a serial data input BATT_GAUGE) SDA and a clock input BATT_GAUGE_SCL. Both of the serial data input BATT_GAUGE) SDA and the clock input BATT_GAUGE_SCL may be connected to pull-up resistors R2 and R1, respectively, before being input to the chip U1. The battery current may be measured across a resistor R3. The current value may be read by the processor using the I2C interface. A first end of the resistor R3 may be connected to a ground pin of the chip U1 and a second end of the resistor R3 may be connected to a chip select not (CSN) pin. A positive terminal of the power source (e.g., battery) may be connected to the "Batt" signal (e.g., connected to the BATT pin on the ga gauge chip). In some example embodiments, the battery current may be read from the gas gauge over the I2C interface.

In some example embodiments, the battery temperature measurement circuit 550 may be a thermistor measurement circuit where a thermistor is placed near the power source 532. In some example embodiments, the battery temperature measurement circuit 550 may be a thermistor measurement circuit, where a thermistor is placed near the power source 532.

In some example embodiments, the multichannel analog-to-digital converter (ADC) 504 may be configured to convert analog voltage measurements from the battery measurement voltage/current measurement circuits 540 and the battery temperature measurement circuit 550 into digital power source (e.g., battery) voltage and/or power source (e.g., battery) temperature measurements. In some example embodiments, the power source (e.g., battery) voltage may be read directly from the battery voltage using a potential divider to match the dynamic range to the measurement range of the analog-to-digital converter (ADC) 504. In some example embodiments, the power source (e.g., battery) temperature measurement may be made using a thermistor measurement circuit that is placed in closed proximity to a surface of the power source 532.

In some example embodiments, the inter-integrated circuit (I2C) interface 506 is a standard serial communication module configured to read power source (e.g., battery) current measurements from a hardware gas gauge chipset via register interface.

In some example embodiments, the memory 560 may describe any of the terms "storage medium", "computer readable storage medium", or "non-transitory computer readable storage medium" and may represent one or more devices for storing data, including, for example, read only memory (ROM), random access memory (RAM), magnetic RAM, core memory, magnetic disk storage mediums, optical storage mediums, flash memory devices, and/or other tangible machine-readable mediums for storing information. The term "computer-readable medium" may include, but is not limited to, portable or fixed storage devices, optical storage devices, and various other mediums capable of storing, containing, or carrying instructions and/or data.

In some example embodiments, the control button 138 may be configured to generate a signal indicating that an adult consumer has switched the aerosol-generating device 100 to an "off" state, ending a session (e.g., aerosol-generating event) of the device 100.

In some example embodiments, the communication screen 136 may be configured to display information related to the aerosol-generating device 100. The communication screen 136 may be configured to display one or more icons to communicate information related to the aerosol-generating device 100. For example, in some example embodiments, the communication screen 136 may be configured to display a charging iconography to the adult consumer. In some example embodiments, the communication screen 136 may be configured to display two icons. For example, in some example embodiments, the communication screen 136 may be configured to display a symbol or icon (e.g., a "lightning bolt" modifier icon) near (e.g., above or over the top of) a current capsule progress display to indicate to the adult consumer that the charging device is active whilst still communicating session progress indicators.

In some example embodiments, the icons displayed on the communication screen 136 may be generally referred to as system icons. The system icons may have a variety of colors, shades, and/or sizes. FIGS. 6A-6I illustrate different embodiments of icons that may be displayed by the communication screen 136.

Figure 6A:
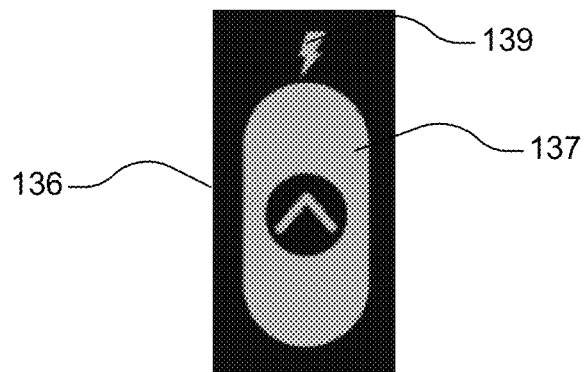
FIGS. 6A-6I are different embodiments of icons that may be presented on a communication screen of an example aerosol-generating device, like the aerosol-generating device illustrated in FIGS. 1-4, in accordance with various aspects of the present disclosure.

For example, FIG. 6A shows an example of the communication screen 136 including a capsule icon 137. The capsule icon 137 may include an oval (or oblong) shape including, for example, as superimposed shape, like a circled arrow as illustrated. The communication screen 136 may also include a modifier icon 139 disposed near to (e.g., above) the capsule icon 137. In some example embodiments, the modifier icon 139 may be a lightning bolt. The capsule icon 137 and the modifier icon 139 may together indicate that the aerosol-generating device 100 is connected to a charging device while in use.

Figure 6B:
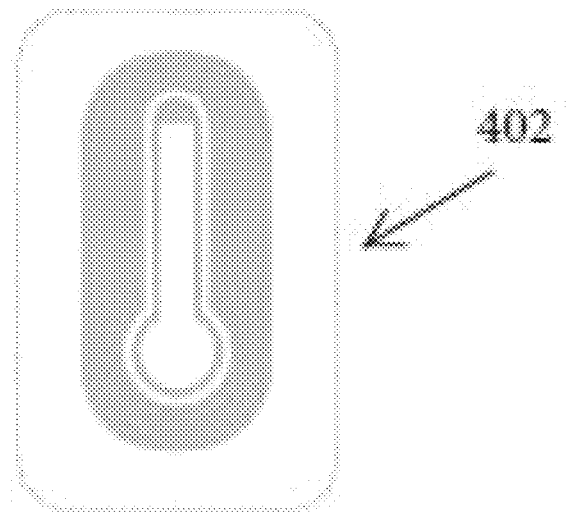

For example, FIG. 6B shows an example of the communication screen 136 including a timer icon 402. In some example embodiments, the timer icon 402 may indicate to an adult consumer how much time is remaining on a cooldown timer so that the consumer knows when the capsule 214 can be removed from the aerosol-generating device 100. The timer icon 402 may be refreshed and updated during the cooldown time to keep the consumer informed about when the capsule 214 will be removable from the aerosol-generating device 100. For example, if there is 90% of the cooldown time remaining on the cooldown timer, the timer icon 402 may appear substantially as shown in FIG. 4A with approximately 90% of the thermometer filled in or shaded. As the cooldown time elapses, the timer icon 402 may be updated such that a shaded portion of the thermometer corresponds to the cooldown time remaining on the cooldown timer.

Figure 6C:
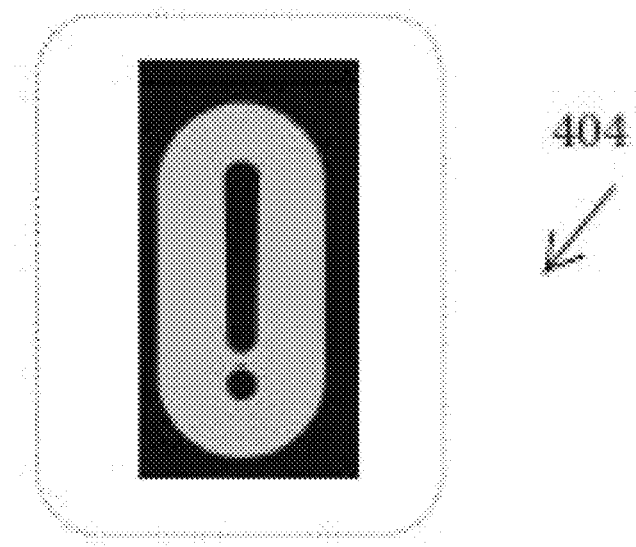
Figure 6D:
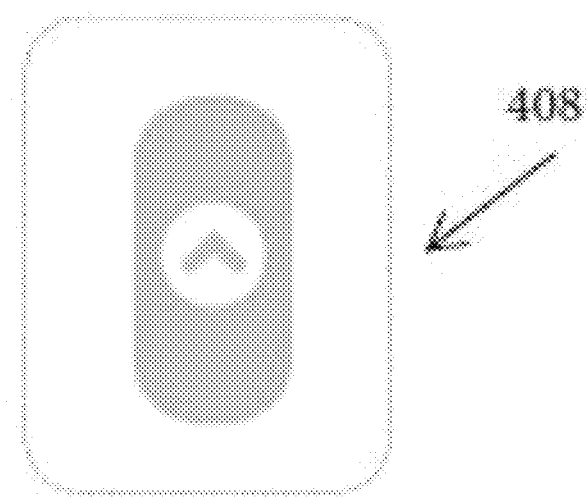

For example, FIG. 6C shows an example of the communication screen 136 including an alert icon 404. In some example embodiments, the alert icon 404 may indicate to the adult consumer that the lid 104 of the aerosol-generating device 100 has been opened while a cooldown timer is active or while a session of the aerosol-generating device 100 is active. The alert icon 404 may indicate to the adult consumer that the capsule 214 is not cooled to a comfortable temperature to be removed from the aerosol-generating device 100.

For example, 6D shows an example of the communication screen 136 including a capsule eject icon 408. In some example embodiments, the capsule eject icon 408 may indicate to the adult consumer that the cooldown timer has elapsed and the capsule 214 may be removed from the device 100.

Figure 6E:
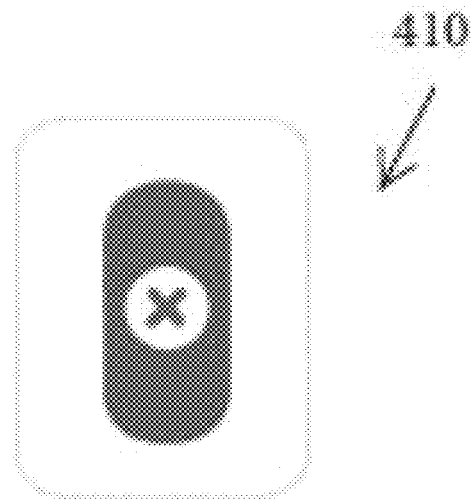

For example, FIG. 6E shows an example of the communication screen 136 including a session end icon 410. In some example embodiments, the session end icon may indicate to the adult consumer that the capsule 214 is empty of the aerosol-forming substrate. The session end icon 410 may indicate that a previously active session of the device 100 has ended. In some example embodiments, the session end icon 410 may be briefly displayed on the communication screen 136 prior to the timer icon 402 being displayed.

Figure 6F:
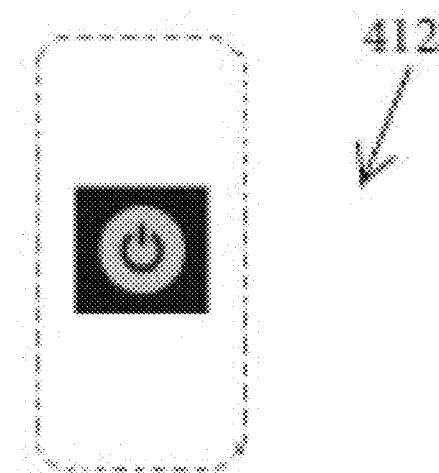

For example, FIG. 6F shows an example of the communication screen 136 including a first power off icon 412. In some example embodiments, the first power off icon 412 may indicate to the adult consumer that the control button 138 has been pressed and held for at least three seconds while the cooldown timer is active. When the control button 138 is pressed for at least three seconds, the aerosol-generating device 100 may be powered off after the cooldown timer elapses. The first power off icon 412 may be displayed while the control button 138 is being pressed and while the second holdoff timer 328 is active.

Figure 6G:
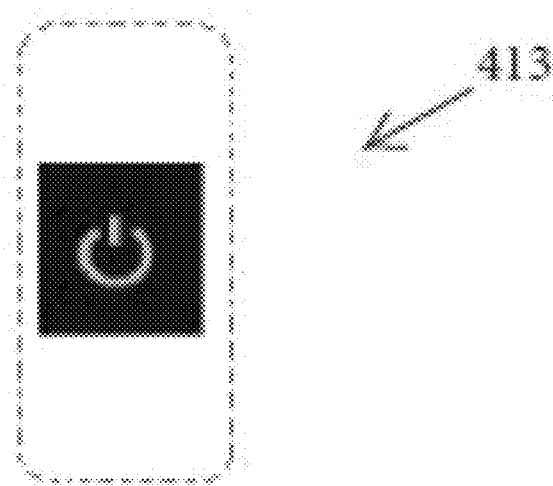

For example, FIG. 6G shows an example of the communication screen 136 including a second power off icon 413. In some example embodiments, the second power off icon 413 may be displayed after the control button 138 is released and tapped for a second time to confirm that the device 100 should be powered off. Once the control button 138 has been pressed for a second time, the first power off icon 412 may be removed from the communication screen 136 by the processor 502. The second power off icon 413 may be similar to the first power off icon 412 but the portion of the icon that is colored may be inversed from the first power off icon 412. The second power off icon 413 may be displayed while the second holdoff timer 328 is active and may be removed from the communication screen 136 when the second holdoff timer elapses.

Figure 6H:
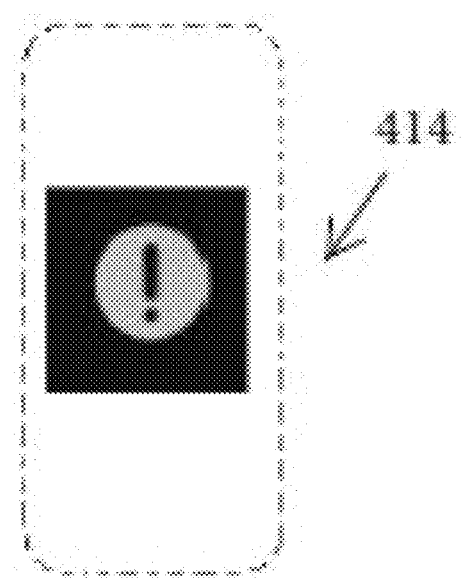

For example, FIG. 6H shows an example of the communication screen 136 including a cooldown aware icon 414. In some example embodiments, the cooldown aware icon 414 may indicate to the adult consumer that the cooldown system 300 is still operating after the consumer has pressed the control button 138 to power off the aerosol-generating device 100. More specifically, the cooldown aware icon 414 may be displayed on the communication screen 136 after the second holdoff timer has elapsed and the first power off icon 412 and the second power off icon 413 have been removed from the communication screen 136. The cooldown aware icon 414 may be displayed until the cooldown timer 322 elapses.

Figure 6I:
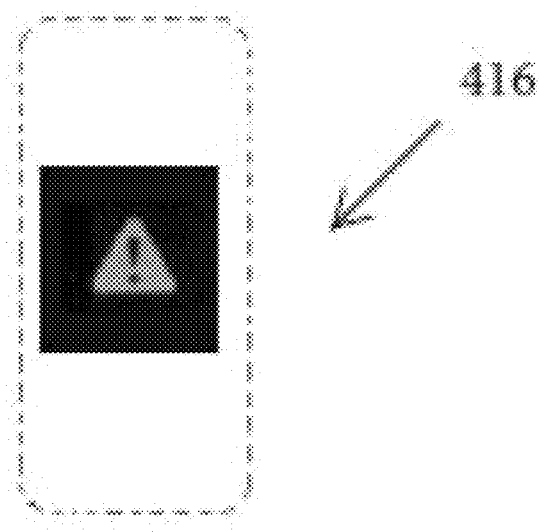

For example, FIG. 6I shows an example of the communication screen 136 including a fault icon 416. In some example embodiments, the fault icon 416 may indicate to the adult consumer that the aerosol-generating device 100 is in a non-operational state such that a session cannot begin. In some example embodiments, the aerosol-generating device 100 may be in a non-operational state or a fault state when the lid 104 of the device 100 has been shut after previously being opened while a session was active or while the cooldown timer 322 was active.

Figure 7:
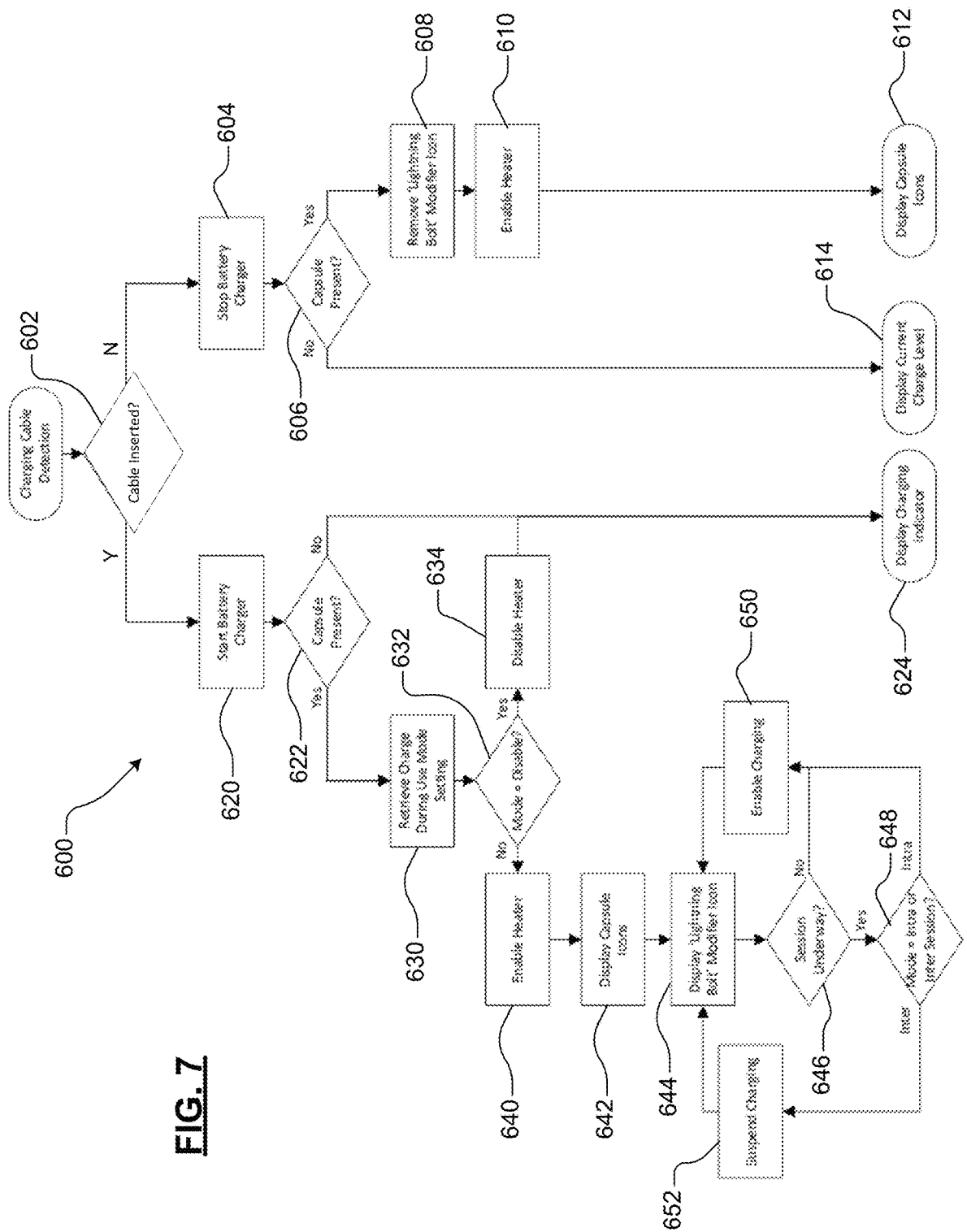
FIG. 7 is a flowchart illustrating an example method of operating the charging system of FIG. 5 in accordance with various aspects of the present disclosure.

FIG. 7 is a flowchart illustrating an example method 600 of controlling a charging system. The processor 503 may perform the method of FIG. 7. The processor 502 may initiate the method 600 when a charging device (e.g., charger or charger cable) event is detected. For example, the processor 502 may receive one or more signals indicates that a state change event as occurred. The charger detection circuit 510 may initiate the one or more signals indicating that the state change event has occurred. The process 502 may continuously monitor the charger detection circuit 510. In some example embodiments, when the processor 502 detects a state change, the method 600 may proceed to conditional step 602 where it is determined whether the one or more signals from the charger detection circuit 510 indicate that the charging device has been connected to (e.g., inserted in) the charging connector 170 or removed from contact with the charging connector 170.

In some example embodiments, if the processor 502 determines that a charging device has been removed from contact with the charging connector 170, the method 600 continues to step 604 where the charging system 500 stops the battery charger 530. The method 600 may then proceed to conditional step 606 where it is determined whether a capsule 214 has been received by the capsule-receiving cavity 210. The charging system 500 may determine if a capsule 214 has been received by the capsule-receiving cavity 210 using an integrity check function and/or a capsule detection switch. In some example embodiments, the integrity check function may be as described in U.S. application Ser. No. 17/947,372, titled "CAPSULE MONITORING SYSTEM FOR AEROSOL-GENERATING DEVICE", filed on same date herewith, the entire contents of which is incorporated herein by reference.

In some example embodiments, when the processor 502 determines that the capsule 214 is not present, the method 600 continues to step 614 where the processor instructs the communication screen 136 to display an icon representing the current charge level. For example, a standard "On" icon may be displayed. In other example embodiments, if the processor 502 determined that the capsule 214 is present, the method 600 continues to step 608 where the processor 502 instructs the communication screen 136 to remove a modifier icon (e.g., "lightning bolt" modifier icon), such as added in step 644, as discussed below. The method 600 may then continue to step 610 where processor 502 instructs the heating engine control 520 to provide energy to the heater disposed in the housing 216 defining the capsule 214. The method 600 may then continue to step 612 where processor 502 instructs the communication screen 136 to display a capsule icon (e.g., FIG. 6A).

In some example embodiments, if processor 502 determined that a charging device has been connect to the charging connector 170, the method 600 continues to step 620, where the processor 503 causes the charging system 500 to start the battery charger 530. In some example embodiments, starting the battery charger 530 may include initiating all systems behaviors associated with the charging processing. Following the step 620, the method 600 may then proceed to conditional step 622 where (like at conditional step 606) it is determined whether a capsule 214 has been received by the capsule-receiving cavity 210. As noted above, the charging system 500 may determine if a capsule 214 has been received by the capsule-receiving cavity 210 using an integrity check function and/or a capsule detection switch.

In some example embodiments, if the processor determines that the capsule 214 is not present, the method 600 continues to step 624 where the processor 502 instructs the communication screen 136 to display a charging indicator (e.g., standard charging indicator). In other example embodiments, when the processor 502 determines that the capsule 214 is present, the method 600 continues to step 630 where the charge during use mode setting is received from the memory 560. The method 600 may then continue to conditional step 632 where it is determined whether the charge during use mode setting is a first (or disable) mode.

In some example embodiments, if the processor 502 determines that the charge during use mode setting is the first (or disable) mode, the method 600 may continue to step 634 where the processor 502 instructs the heating engine control 520 to terminate (or disable) heating of (e.g., stop providing energy to) the heater disposed in the housing 216 defining the capsule 214. The method 600 may then continue to step 624 where, as noted above, the processor 502 instructs the communication screen 136 to display a charging indicator. In other example embodiments, if the processor 502 determines that the charge during use mode is not the first (or disable) mode, the method 600 may continue to step 640 where (like at step 610) the processor 502 instructs the heating engine control 520 to provide energy to the heater disposed in the housing 216 defining the capsule 214. The method 600 may then continue to step 642 where the processor 502 instructs the communication screen 136 to display a capsule icon (e.g., FIG. 6A).

In some example embodiments, after step 642, the method 600 may continue to step 644 where the processor 502 instructs the communication screen 136 to display a symbol or icon (e.g., "lightning bolt" modifier icon) near (e.g., above or over the top of) the current capsule progress display (e.g., FIG. 6A) to indicate to the adult consumer that the charging device is active whilst still communicating session progress indicators. That is, the "lightning bolt" modifier icon is an indication that the charging device is connected and is not an indication that charging current is being supplied to the power source 532.

In some example embodiments, following step 644, the method 600 may continue to conditional step 646 where it is determined if a session (e.g., aerosol-generating event) is ongoing. In some example embodiments, if the processor 502 determines that no session (e.g., aerosol-generating event) is ongoing, the method 600 may continue to step 650 where charging is enabled (e.g., the charging system 500 starts the battery charger 530). The method 600 then returns to step 644. In other example embodiments, if the processor 502 determines that a session (e.g., aerosol-generating event) is ongoing, the method 600 may continue to conditional step 648 where it is determined if the charge during use mode setting is the second (or intra-session) mode or the third (or inter-session) mode.

In some example embodiments, if the processor 502 determines that the charge during use mode setting is the second (or intra-session) mode, the method 600 continues to step 650 where processor 502 causes charging to be enabled (e.g., the charging system 500 starts the battery charger 530). In some example embodiments, the enabling step 650 enables charging current. Following the step 650, the method 600 then returns to step 644, forming a continuous loop. In other example embodiments, if the processor 502 determines that the charge during use mode setting is the third (or inter-session) mode the method 600 continues to step 652 where the processor 502 instructs the battery charger 530 to suspend charging for the duration of the session. In some example embodiments, the processor instructs the battery charger 530 to suspend charging current.

After the step 652, charging is re-enabled and the method 600 returns to step 644, forming a continuous loop. In some example embodiments, the suspension of the charging and re-enabling does not start or stop the charging process but rather suspends the charging by setting the charging current to 0 mA, for example by dedicating a 'suspend' input on the charging device chipset.

In some example embodiments, when the processor 502 determines that a session is underway (i.e., conditional step 646) and the second (or intra-session) mode is active, a near fully charged power source may reach a fully charged state during a session (e.g., by reaching a battery float voltage). In such instances, the battery monitoring system (or battery voltage/current measurement circuits) 540 will automatically end the charging cycle independently of the charging during use functionality. In such instances, the "lightning bolt" modifier icon may continue to be displayed by the communication screen 136 because as noted about the "lightning bolt" modifier icon is an indication that that charging device is connected and not an indication that charging is ongoing.

In some example embodiments, when the processor 502 determines that a session is underway (i.e., conditional step 646) and the second (or intra-session) mode is active and a power source is depleted by the heating energy used during the session, the energy usage will cause the power source voltage to reduce to a point where the battery monitoring system (or battery voltage/current measurement circuits) 540 will re-start charging in order to 'top-up' the charge level.

In some example embodiments, when the processor 502 determines that a session is underway (i.e., conditional step 646) and the second (or intra-session) mode is active and a flow of charging current to the power source 532 may be reduced by an amount about equal to the current flowing to the heater disposed in the housing 216 defining the capsule 214. In such instance, the current from the charging circuit (i.e., from the charger) may bypass the power source and the processor 502 may use the current from the charging circuit to directly supply the heater.

The systems, apparatuses, and methods described herein may provide significant advantages. For example, the charging system 500 accommodates multiple use cases where it may be unpracticable to physically disconnect the charging device from the aerosol-generating device 100 and reduces time to use and thermal rise when a fully discharged aerosol-generating device 100 is connected to the charging device.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A charging system for an aerosol-generating device configured to receive a capsule, the charging system comprising:
    a processor; and
    a memory in communication with the processor and configured to store instructions, the instructions defining at least one of a disable mode, an intra-session mode, or an inter-session mode;
    the processor being configured to execute the instructions to cause the charging system to:
        detect when the aerosol-generating device is connected to a charging device;
        activate a power source charger in response to the connection to the charging device;

identify a selected mode of the at least one of the disable mode, the intra-session mode, or the inter-session mode;
enable or disable a heater of the capsule dependent upon the selected mode;
if the heater is enabled, display a first display indicating the connection of the charging device;
if the heater is enabled, detect if a session of the aerosol-generating device is ongoing; and
if the session is ongoing, enable or suspend charging in response to the identification of the selected mode.

2. The charging system of claim 1, wherein the selected mode is the disabled mode, and the processor is configured to execute the instructions to cause the charging system to:
disable the heater; and
display a second icon indicating an active charging state.

3. The charging system of claim 1, wherein when no session is ongoing, the processor is configured to execute the instructions to cause the charging system to enable charging, and to display a second display indicating a charge state.

4. The charging system of claim 1, wherein the selected mode is the intra-session mode, and the processor is configured to execute the instructions to cause the charging system to enable the charging, and to display a second display indicating a capsule session progress.

5. The charging system of claim 1, wherein the selected mode is the inter-session mode, and the processor is configured to execute the instructions to cause the charging system to suspend the charging, and to display a second display indicating a capsule session progress.

6. The charging system of claim 5, wherein the processor is configured to execute the instructions to cause the charging system to suspend the charging by reducing a charging current to 0 mA.

7. The charging system of claim 1, wherein the first display is a lightning bolt icon.

8. The charging system of claim 7, wherein the first display is disposed above a second icon.

9. The charging system of claim 8, wherein the second icon is a capsule session progress indicator.

10. The charging system of claim 8, wherein the second icon is a charge state icon.

11. The charging system of claim 1, wherein the processor is configured to execute the instructions to further cause the charging system to:
determine if the capsule is present;
if the capsule is present the selected mode is identified; and
if the capsule is not present, display, on a user interface, a second display indicating charge state.

12. The charging system of claim 11, wherein the processor is configured to execute the instructions to cause the charging system to send one or more signals to the user interface, the one or more signals indicating the that a capsule is absent and prompting the user interface to display the second display.

13. The charging system of claim 1, wherein the processor is configured to execute the instructions to cause the charging system to obtain one or more signals from a charger detection, the one or more signals indicating that the aerosol-generating device has been connected to the charging device.

14. The charging system of claim 1, wherein the processor is configured to execute the instructions to cause the charging system to send one or more signals to a heating engine control to enable or disable the heater.

15. The charging system of claim 1, wherein the processor is configured to execute the instructions to cause the charging system to obtain one or more signals from a control button, the one or more signals indicating that a user has switched the device off causing the session to end.

16. The charging system of claim 1, wherein the processor is configured to execute the instructions to cause the charging system to obtain one or more signals from a control button, the one or more signals indicating that a user has switched the device on causing the session to begin.

17. The charging system of claim 1, wherein the processor is configured to execute the instructions to cause a charging system to send one or more signals to a user interface, the one or more signals indicating the charging state and prompting the user interface to display a second display.

18. The charging system of claim 1, wherein the processor is configured to execute the instructions to cause the charging system to activate the power source charge if the charging system obtains one or more signals from a power source monitoring system, the one or more signals indicating that the power source is not fully charged.

* * * * *